Patented May 23, 1933

1,910,846

UNITED STATES PATENT OFFICE

ALEXANDER T. MAXIMOFF, OF NEW YORK, N. Y., ASSIGNOR TO THE NAUGATUCK CHEMICAL COMPANY, OF NAUGATUCK, CONNECTICUT, A CORPORATION OF CONNECTICUT

POLYMERIZATION OF ERYTHRENE AND ITS HOMOLOGUES

No Drawing.   Application filed May 8, 1926.   Serial No. 107,793.

This invention relates to the polymerization of erythrene and its homologues and more particularly to the polymerization of emulsions of these compounds and to products obtained thereby.

The principal object of the invention is to provide a method for polymerizing emulsions of erythrene or its homologues to give synthetic rubber latex. Another object is to carry out such polymerization by means of fatty acids, fatty acid salts or of substances containing such fatty acid compounds. A further object is to accelerate such polymerization in the presence of agents of the oxidizing type such as peroxides, bichromates, etc., terpenes, and the like. Another object is to prepare a synthetic rubber latex or water emulsion.

The following examples illustrate methods of carrying out the invention, but they are not intended to serve as limitations, for other materials and proportions may be used. The invention comprises emulsifying erythrene or a homologue thereof in water with a fatty acid compound and polymerizing this emulsion in the presence of a peroxide, removing unpolymerized erythrene and recovering an aqueous emulsion of synthetic rubber, that is a synthetic rubber latex. The invention also includes the production of latices containing synthetic rubber as well as natural rubber.

One method of carrying out the invention is as follows: 100 parts of dimethyl-erythrene and 8.7 parts by weight of oleic acid are emulsified in 350 parts by volume of 10% ammonium hydroxide. To this emulsion are then added 18 parts by volume of a 3% hydrogen peroxide. The emulsion is then allowed to stand at room temperature for about 8 days. Unpolymerized dimethyl erythrene may be removed by heating the emulsion to the boiling point of dimethyl erythrene. The remaining emulsion comprises a synthetic rubber latex, in that it is a latex containing synthetic rubber in emulsified form. It may be coagulated by the addition of acetic acid or most of the other known coagulants for ordinary rubber latex.

The proportion of peroxide may be increased whereupon the amount of polymer will be increased, and at the same time may have somewhat different properties, particularly in its increased adhesiveness. Satisfactory results in respect to yield are obtained with about 1% of peroxide based on the dimethyl erythrene. With lesser amounts a smaller yield of polymer is obtained, while with greater amounts a larger yield of more adhesive polymer is obtained. The time and temperature may be varied to control the extent of polymerization. Polymerization of the dimethyl erythrene may be accelerated by carrying out the process at say 50–150° C., in which instance the length of time will be much less than 8 days in the above example. Instead of hydrogen peroxide, other oxidizing agents may be employed. Potassium bichromate may be used and other well known oxidizing agents.

In the above example the oleic acid and ammonia form ammonium oleate, and in some instances it may be desirable to add ammonium oleate as such instead of forming this compound in the emulsion. Other bases may be used instead of ammonium hydroxide, although the latter is preferred. Saponin may be employed in the formation of the emulsion. In the above example ammonium oleate acts as a polymerization agent, while the peroxide functions as an accelerator of such polymerization. This being the case the peroxide may be omitted if desired. As an illustration, 100 grams of dimethyl erythrene may be emulsified with 3.6 grams of oleic acid and 120 ccs. of 10% ammonium hydroxide. This emulsion will give a synthetic rubber latex containing about 15% of synthetic rubber after five days standing at room temperature. The addition of 35 cc. of 3% hydrogen peroxide to this emulsion will in the same time give in the neighborhood of 40% of synthetic rubber. Doubling the amount of oleic acid in the same example will add another 10% to the amount of polymer formed in the same time.

An acceleration of polymerization is also exhibited by other fatty acids, such as stearic acid. The use of oxidized linseed oil for example as a source of fatty acid likewise furnishes an increased yield of rubber. In five days at room temperature an emulsion containing dimethyl erythrene, oleic acid, ammonia and oxidized linseed oil yielded about 80% of rubber. The property of acting as polymerization agents is exhibited by oxidized fatty acids, as well as by ammonium salts and ethers of the unsaturated aliphatic acids.

Dimers of the terpene series function as accelerators of polymerization. An emulsion is made of 100 grams of dimethyl erythrene, 10 grams of oleic acid, 350 cc. of 10% ammonium hydroxide, 70 cc. of 3% hydrogen peroxide and 18 cc. of turpentine. This emulsion, after standing for 5 days at room temperature will give approximately 65% of synthetic rubber.

Similar results may be obtained with erythrene instead of dimethyl erythrene, but since erythrene is a gas at ordinary temperatures, the polymerization must be carried out under pressure, for example in an autoclave at 2–3 atmospheres. The unpolymerized erythrene will evaporate off when the pressure is released.

To produce a latex of synthetic rubber, substantially similar to natural latex, one may add to the emulsion suitable proteins, resins and inorganic material. The synthetic rubber latex may be blended with natural latex. The above invention furnishes a method for preparing the so-called artificial latices. Ordinary rubber, such as crepe, may be softened with dimethyl erythrene and then emulsified in water containing a polymerizing agent such as ammonium oleate, and if desired, an accelerator of polymerization. This emulsion, when allowed to stand for a few days at room temperature, will comprise an artificial latex containing synthetic rubber. If erythrene be used in place of dimethyl erythrene the emulsification and polymerization may be carried out under pressure. Either vulcanized or reclaimed rubber may be used instead of crude rubber.

In place of erythrene, its homologues, such as isoprene, piperylene, phenyl-butadiene, and also styrol, etc., may be employed. The homologues of erythrene include acyl aryl and heterocyclic substitutions.

By changing the proportions of catalyst and by using different accelerators of polymerization, various properties of synthetic rubber latex may be obtained. It is possible by this means to obtain a latex which will yield a very sticky rubber-like product, suitable for adhesive purposes.

If it be desired to recover synthetic rubber from these synthetic latices, it is only necessary to add a latex coagulant, for example acetic acid, and the synthetic rubber is coagulated and may be recovered in the usual way. The synthetic rubber may be recovered, if desired, by evaporation of the latex, or by spraying, or by other methods.

Having thus described my invention, what I claim and desire to protect by Letters Patent is:

1. A process for preparing emulsions of synthetic rubber which comprises forming an aqueous emulsion of a diene and a water-soluble soap, allowing the diene to polymerize, separating the unpolymerized diene from the emulsion, and recovering a synthetic rubber latex.

2. A process for preparing emulsions of synthetic rubber which comprises forming an aqueous emulsion of an erythrene and a water-soluble soap allowing the erythrene to polymerize, separating the unpolymerized erythrene from the emulsion, and recovering a synthetic rubber latex.

3. A process for preparing aqueous emulsions of synthetic rubber which comprises forming an aqueous emulsion of a substituted erythrene and a water-soluble soap, allowing said erythrene to polymerize, separating the unpolymerized erythrene from the emulsion, and recovering a synthetic rubber latex.

4. A process for preparing aqueous emulsions of synthetic rubber which comprises forming an aqueous emulsion of dimethyl erythrene and a water-soluble soap, allowing the dimethyl erythrene to polymerize, separating the unpolymerized dimethyl erythrene from the emulsion, and recovering a synthetic rubber latex.

5. A process for preparing aqueous emulsions of synthetic rubber which comprises preparing an aqueous emulsion of dimethyl erythrene, ammonia and oleic acid, polymerizing said emulsion, removing unpolymerized dimethyl erythrene, and recovering a synthetic rubber latex.

6. A process for preparing aqueous emulsions of synthetic rubber which comprises forming an aqueous emulsion of dimethyl erythrene and a water-soluble fatty acid soap, polymerizing said emulsion, removing unpolymerized dimethyl erythrene, and recovering a synthetic rubber latex.

7. A process for preparing aqueous emulsions of synthetic rubber which comprises preparing an aqueous emulsion of dimethyl erythrene, ammonia and oleic acid, adding an oxygen containing polymerization accelerator, polymerizing said emulsion, removing unpolymerized dimethyl erythrene, and recovering a synthetic rubber latex.

8. A process for preparing aqueous emulsions of synthetic rubber which comprises preparing an aqueous emulsion of dimethyl erythrene, ammonia, oleic acid and a peroxide, polymerizing said emulsion, removing unpolymerized dimethyl erythrene, and recovering a synthetic rubber latex.

9. A process for preparing aqueous emulsions of synthetic rubber which comprises preparing an aqueous emulsion of dimethyl erythrene, ammonia, oleic acid and an inorganic peroxide, polymerizing said emulsion, removing unpolymerized dimethyl erythrene, and recovering a synthetic rubber latex.

10. A process for preparing aqueous emulsions of synthetic rubber which comprises preparing an aqueous emulsion of dimethyl erythrene. ammonia, oleic acid and hydrogen peroxide, polymerizing said emulsion, removing unpolymerized dimethyl erythrene, and recovering a synthetic rubber latex.

11. A process for preparing aqueous emulsions of synthetic rubber which comprises preparing an aqueous emulsion of dimethyl erythrene, ammonia, oleic acid and hydrogen peroxide, allowing said emulsion to polymerize at temperatures below approximately 150° C., removing unpolymerized dimethyl erythene, and recovering a synthetic rubber latex.

12. A process for preparing aqueous emulsions of synthetic rubber which comprises preparing an aqueous emulsion of dimethyl erythrene, ammonia, oleic acid and hydrogen peroxide, allowing said emulsion to polymerize at room temperature, removing unpolymerized dimethyl erythrene, and recovering a synthetic rubber latex.

13. A synthetic rubber latex containing a polymerized erythrene emulsified in water in the presence of a water soluble salt of a soap-forming acid.

14. A synthetic rubber latex comprising an aqueous emulsion of a synthetic erythrene rubber and a water-soluble fatty acid soap.

15. A process of preparing emulsions of synthetic rubber which comprises forming an emulsion of a diene and a water soluble salt of a soap-forming acid, allowing the diene to polymerize, and recovering a synthetic rubber latex.

16. A process of preparing emulsions of synthetic rubber which comprises forming an aqueous emulsion of a butadiene and a water soluble soap of a soap-forming acid, allowing the butadiene to polymerize, and recovering a synthetic rubber latex.

17. A process of preparing emulsions of synthetic rubber which comprises forming an aqueous emulsion of dimethyl erythrene and a water soluble soap of a soap-forming acid, allowing the dimethyl erythrene to polymerize, and recovering a synthetic rubber latex.

18. A method of treating butadiene hydrocarbon which comprises adding oleic acid thereto and subsequently introducing alkali into the mixture, thereby forming an emulsion of the hydrocarbon and a soap.

19. A method of treating butadiene hydrocarbons which comprises adding oleic acid thereto and subsequently introducing ammonia into the mixture to form a soap.

20. The process of producing synthetic rubber from a butadiene hydrocarbon adapted to be polymerized to form synthetic rubber which comprises polymerizing an aqueous emulsion of said hydrocarbon in the presence of a water soluble soap.

21. An artificial latex comprising a rubber synthesized from an emulsion of a polymerizable butadiene hydrocarbon and a water soluble salt of a soap-forming acid.

22. A process of preparing emulsions of synthetic rubber which comprises forming an aqueous emulsion of a diene and a water-soluble soap of a soap-forming acid, adding an oxygen-containing polymerization accelerator, polymerizing the diene, and recovering a synthetic rubber latex.

Signed at New York, county and State of New York, this 30th day of April, 1926.

ALEXANDER T. MAXIMOFF.